United States Patent [19]

Osman et al.

[11] Patent Number: 4,767,729

[45] Date of Patent: Aug. 30, 1988

[54] PROCESS FOR THE PREPARATION OF A VOLTAGE-DEPENDENT CERAMIC RESISTANCE BASED ON ZNO, AND A RESISTANCE PRODUCED BY THE PROCESS

[75] Inventors: Maged A. Osman, Zürich; Roger Perkins, Baden-Rütihof; Friedrich Schmückle, Mellingen; Claus Schüler, Widen, all of Switzerland

[73] Assignee: BBC Brown, Boveri & Company, Limited, Baden, Switzerland

[21] Appl. No.: 857,062

[22] Filed: Apr. 29, 1986

[30] Foreign Application Priority Data

Apr. 29, 1985 [CH] Switzerland ........................ 1808/85

[51] Int. Cl.[4] ............................................... C04B 35/02

[52] U.S. Cl. ......................................... 501/94; 501/1; 264/61

[58] Field of Search ........................ 501/94, 1; 264/61

[56] References Cited

U.S. PATENT DOCUMENTS 4,142,996 3/1979 Wong et al. ........................... 501/1
4,318,995 3/1982 Rhodes et al. ......................... 501/1

FOREIGN PATENT DOCUMENTS 60-21862 2/1985 Japan .................................... 501/94

*Primary Examiner*—Steven Capella
*Attorney, Agent, or Firm*—Burns, Doane, Swecker & Mathis

[57] ABSTRACT

A voltage-dependent ceramic resistance (varistor) based on ZnO and other addition elements, mostly in the form of oxides, is prepared, in that the addition elements are added to a suspension of ZnO powder in $H_2O$ as chemical substances in the form of aqueous, mutually compatible, non-separating solutions of organic salts, acids, complex compounds and/or colloids, the suspension/aqueous solution formed in this manner is dried in the presence of air in a spray dryer, the free-flowing powder/granules prepared in this manner are pressed to a body and the pressed body is subjected to heat treatment, in order to decompose the organic substances, convert them into oxides, remove the decomposition products, and is finally sintered by successive heating to 650° C., 900° C. and 1100° to 1300° C. The water-soluble chemical substances to be used are preferably organic salts such as formates, acetates, lactates, tartrates, citrates, ammonium citrates and ammonium tartrates. Other suitable additions ar ammonia, ammonium salts of hydroxycarboxylic acids, organic amines, ammonium tetraborate, ammonium dichromate, ammonium silicotungstate, oligo-silicic acid and silicon hydroxide sol.

6 Claims, 1 Drawing Sheet

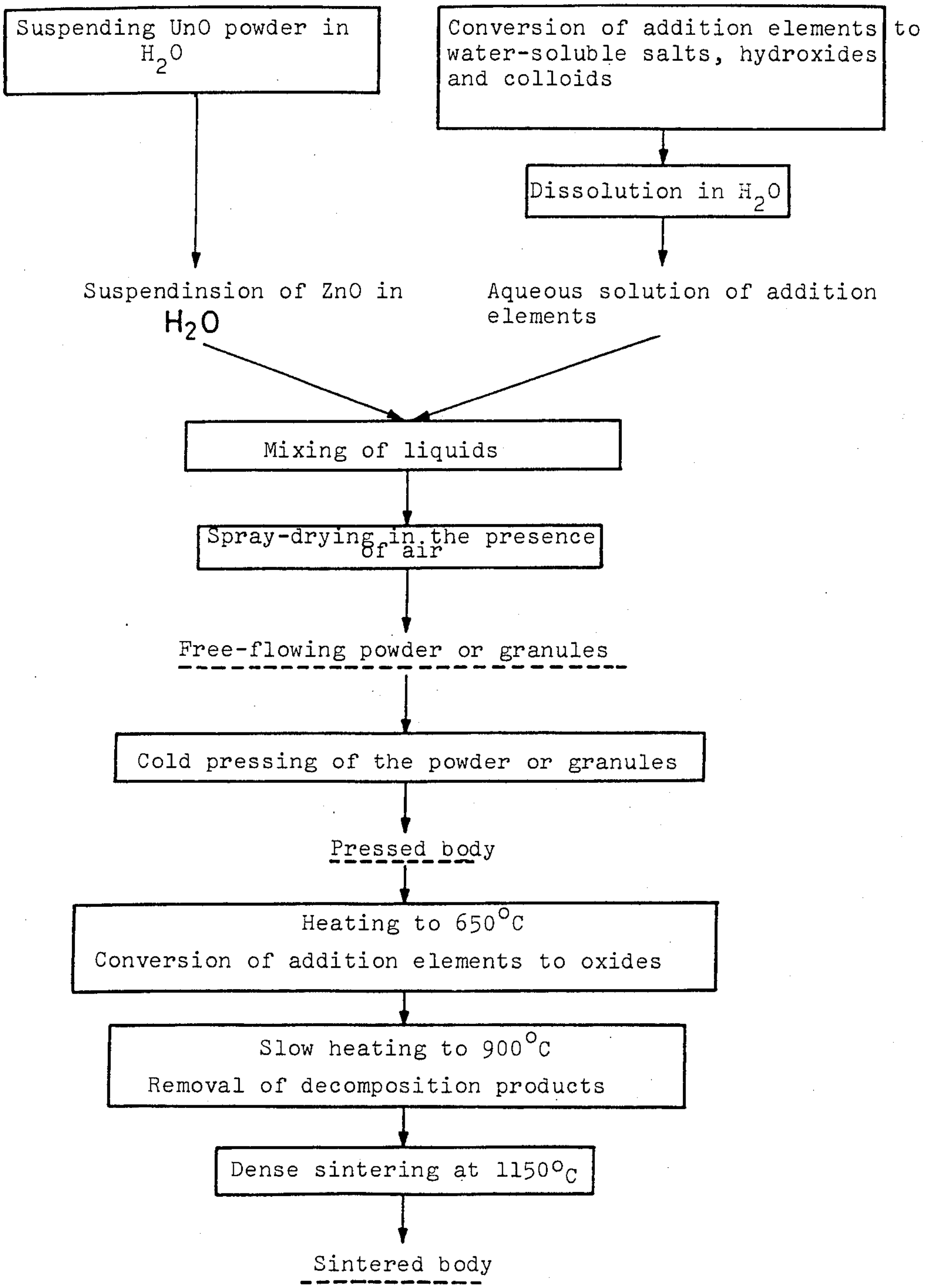
Suspending UnO powder in H2O
Conversion of addition elements to water-soluble salts, hydroxides and colloids
Dissolution in H2O
Suspendinsion of ZnO in H2O
Aqueous solution of addition elements
Mixing of liquids
Spray-drying in the presence of air
Free-flowing powder or granules
Cold pressing of the powder or granules
Pressed body
Heating to 650°C
Conversion of addition elements to oxides
Slow heating to 900°C
Removal of decomposition products
Dense sintering at 1150°C
Sintered body

PROCESS FOR THE PREPARATION OF A VOLTAGE-DEPENDENT CERAMIC RESISTANCE BASED ON ZNO, AND A RESISTANCE PRODUCED BY THE PROCESS

The invention relates to a process for the preparation of a voltage-dependent ceramic resistance based on ZnO, and other oxides selected from the group of addition elements Co, Mn, Cr, Ni, Ba, Bi, Sb, rare earths, Al, B, Si, Ga and Ti and to a resistance based on ZnO and other oxides of the group of addition elements Co, Mn, Cr, Ni, Ba, Si, Sb, rare earths, Al, B, Si, Ga, and Ti.

Voltage-dependent resistances (varistors) based on ceramic sintered bodies containing preponderantly ZnO, are known in many variants. Their electrical properties are determined mainly by the addition elements present mostly as oxides—above all metal oxides. These additions are present in amounts from a thousandth part of a mole percent to a few mole percent, and they must be uniformly distributed in the ZnO matrix.

The current standard processes for their preparation start usually from metal oxides in powder form. Here, the uniformity of the materials, starting with the powder mix, through the pressed body, to the finished sintered body, plays a decisive role. The processes comprise homogeneous mixing and grinding in the presence of auxiliary carrier fluids, mostly in the form of an aqueous suspension (compare, for example, EP-A Nos. 0 115 149; 0 115 050; EP-B No. 0 029 749).

The ZnO varistors, prepared in this manner by mixing and grinding of powders, followed by pressing and sintering, generally suffer from inadequate uniformity of the sintered bodies. It is in practice impossible to distribute uniformly the additions present in extremely small amounts through the ZnO crystallites or particle boundaries. Segregation during the fabrication process, formation of undesirable phases by impurities in the form of dust during the grinding processes etc., further impair the physical properties of the varistors produced in this manner. Exact reproducibility is therefore virtually unattainable using these conventional methods.

Instead of starting from oxide powders composed of the desired components, it has already been proposed to use the elements in the form of suitable aqueous solutions of inorganic salts and obtain a more uniform mixture of all components by joint precipitation of the salts as hydroxides (compare, for example, EP-A No. 0 097 923). The precipitated hydroxide is subsequently converted into the corresponding oxide and the resulting powder must be likewise ground and sieved. However, these experiments also failed to lead to the desired objective of maximum uniformity of composition right down to the smallest particles of individual crystallites and their particle boundaries. In addition, impurities due to inorganic acid residues such as $Cl^-$, $SO_4 2$—, $PO_4 3$— and others which are difficult to remove, are disadvantageous.

There is therefore a great need for novel and complete processes to produce ZnO varistors in order to be able better to utilize in industry their per se excellent electrical properties.

The invention is based on the object of providing a process for the preparation of a voltage-dependent ceramic resistance as well as to a resistance based on ZnO and other oxides produced by the said process, which leads to, as far as possible, uniform sintered bodies with reproducible composition and concentration of the various components, and is especially suitable for a planned and controlled mass production.

The invention will be described below with reference to the preparative examples, further elucidated by a FIGURE.

The FIGURE represents a flow diagram of the process in block representation. It does not require further clarification.

The essence of the invention consists of mixing the addition elements (dopants) in the form of water-soluble organic salts with a suspension of ZnO powder. Many metal salts of simple organic carboxylic acids, such as formic, acetic and propionic acids etc., are soluble in water. However, the simple salts of some important elements are insoluble in water. This problem can be obviated by using salts or half-salts or mixed salts ($NH_4$) of the dicarboxylic, tricarboxylic and tetracarboxylic acids. Hydroxycarboxylic acids (for example lactic acid, tartaric acid, citric acid) are most suitable for this purpose on the principle "equal dissolves equal". $NH_3$ and organic amines (for example hexamethylenetetramine) form with the organic metal salts water-soluble complexes or addition compounds which are also suitable for this purpose. The addition of an ammonium salt of the hydroxycarboxylic acids mentioned often increases the solubility of the simple organic metal salts. Furthermore, some of the addition elements (for example boron, chromium, silicon) are capable of forming acids, the ammonium salts of which are soluble in water and can be used. Lower alkyl esters, for example methyl and ethyl esters of oligo-orthosilicic acid, are water-soluble and can be used for doping the ceramic material with silicon. The suspension of ZnO in the aqueous solution which contains all the addition elements, is dewatered by spray drying. For this purpose, the suspension is atomized to a stream of fine droplets in a stream of hot air. The water evaporates exceptionally quickly, and the ZnO particles contained in a droplet coalesce by baking with the separated salts of the addition elements to form compact, spherical agglomerates of 5–50 μm in diameter. Free-flowing, readily pressable granules form. In the rapid evaporation of the water, the salts are precipitated on the ZnO particles in an amorphous, i.e. non-crystalline, form. Any separation of the mixture by crystallization is thus prevented; for this reason the distribution of the addition elements even in microscopic dimensions is fully uniform. The organic salts can be readily converted, without leaving a residue, at relatively low temperatures, to metal oxides prior to or during the first phase of the sinter process. Grinding or sieving processes are unnecessary.

PREPARATIVE EXAMPLE 1

A voltage-dependent ceramic resistance based on ZnO, having the following composition, was prepared.

ZnO: 98.8 mol-%

Bi: 0.2 mol-%

Co: 1.0 mol-%

0.988 mole of ZnO powder (=80.39 g) was first suspended in 100 ml of water with the addition of 1 g of diammonium citrate, using a high-shear mixer. At the same time 4 ml of a solution of ammonium bismuth citrate (concentration 0.5 g-atom of Bi in 1000 ml of solution) and 20 ml of a solution of ammonium cobalt citrate (concentration 0.5 g-atom of Co in 1000 ml of solution) were added. Immediately following, the suspension was sprayed in the presence of air with the aid of a spray drier to form a free-flowing powder. The powder consisted of spherical agglomerates 5 to 50 μm in diameter. Tablets 20 mm in diameter and 5 mm high were prepared from this powder by uniaxial pressing in a steel mold. The tablets were subjected to progressive heat treatment in an oven in the presence of air. The first phase consisted of heating to a temperature of 650° C. for the purpose of converting the addition elements to oxides, the rate of temperature increase being 50° C./hour. The second phase consisted of a slow temperature increase at the rate of 15° C./hour to 900° C., with the main purpose of completely displacing any residual decomposition products. The last phase consisted of a temperature increase at the rate of 100° C./hour up to 1150° C., followed by dense sintering at this temperature for 1 hour. The finished sintered body was then cooled to room temperature.

PREPARATIVE EXAMPLE 2

A varistor of the composition given below was prepared using the method given in Example 1:

ZnO: 100 mol-%
Bi: 1.2 mol-%
Sb: 2.5 mol-%
Co: 1.2 mol-%
Mn: 0.4 mol-%
Cr: 0.1 mol-%
Ba: 0.1 mol-%
B: 1.0 mol-%
Si: 1.0 mol-%

1 mole of zinc oxide powder was suspended in 100 ml of water with the addition of 1 g of diammonium citrate, using a high-shear mixer. At the same time, the addition elements listed above were mixed into the liquid in the form of aqueous solutions of their organic salts in correct stoichiometric ratio.

Further processing followed the method given in Example 1.

PREPARATIVE EXAMPLE 3

First of all, aqueous solutions of metal salts (corresponding to the required addition elements) of organic acids were prepared. To prepare a voltage-dependent ceramic resistance of the composition given below, the elements were selected in the given stoichiometric ratio:

ZnO: 100 mol-%
Bi: 1.0 mol-%
Sb: 1.0 mol-%
Co: 1.0 mol-%
Mn: 1.0 mol-%
Cr: 0.5 mol-%

The aqueous solution of the metal salts was added to a suspension of 100 mole of ZnO in 0.5% of diammonium hydrogen citrate solution with strong stirring using a high-shear mixer. In addition, polyvinyl alcohol was added to the suspension as binder. The suspension was then converted in a spray drier in the presence of air to a free-flowing powder. Further processing followed the method given in Example 1. The sinter process was carried out at a temperature of 1200° C. for 2 hours.

PREPARATIVE EXAMPLE 4

A varistor mixture of the composition given below was prepared following the method given in Example 3, and a varistor sintered body was produced from the powder mix prepared in this manner.

ZnO: 100 mol-%
Bi: 1.0 mol-%
Sb: 2.0 mol-%
Co: 0.5 mol-%
Mn: 0.5 mol-%
Cr: 0.2 mol-%
Ba: 0.2 mol-%
Al: 0.01 mol-%
B: 0.2 mol-%
Si: 0.3 mol-%

The invention is not limited to the preparative examples. In general, the addition elements (doping elements) can be added to the ZnO suspension in water in the form of aqueous and/or colloidal solutions of organic salts or complex compounds, or the last-named can be added to the first-named successively during the suspension preparation with stirring. Preferably, this refers to the elements Bi, Sb, Co, Mn, Ni, Cr, Al, Ga, Ba, B, Si, Ti, Pr, W, rare earths etc. The following can be used with advantage as water-soluble chemical compounds: formates, acetates, lactates, tartrates, citrates, ammonium citrates, ammonium tartrates etc. In addition, for the elements Cr, Si and B there are suitable acids, their ammonium salts or alkyl esters. In general, the addition element can be added to the ZnO suspension in $H_2O$ in the form of a water-soluble salt of a hydroxy-substituted or unsubstituted mono, di, tri or tetracarboxylic acid. The addition elements Cr, Si and B can be added to the ZnO suspension in $H_2O$ in the form of true or colloidal solution of their acids or the ammonium salts thereof or as alkyl esters or as hydroxide sols, in each case in water. Ammonia, an ammonium salt of a hydroxycarboxylic acid or an organic amine can optionally be added to the solutions. Other suitable addition substances are ammonium tetraborate, ammonium dichromate, ammonium silicotung-state, oligosilic acid etc. Temperatures of 400° to 650° C. are in general sufficient for the decomposition of organic residues. The powder or granules, produced by spray drying, can also be heated to 400°–700° C. prior to the uniaxial, two-dimensional radial or isostatic cold pressing. The spray drying itself can also be carried out at temperatures from 400°–700° C. (spray pyrolysis). In both cases the addition elements are converted to their oxides. The sinter process can be carried out during ½ to 2 hours at temperatures between 1100° C. and 1300° C.

The voltage-dependent ceramic resistance prepared by the novel process is characterized by a macroscopically and microscopically uniform distribution of the addition elements in the ZnO matrix and in the particle boundaries. The phases containing the addition elements do not exhibit agglomerations and have a diameter of less than 2 μm.

The advantages of the novel process are obvious. For varistors, che relationship between electrical parameters is mostly represented by an approximation formula which reproduces the dependence of the current density on the electrical field strength:

$$j \sim \frac{(E)}{G} \alpha$$

j = current density in $mA/cm^2$
E = electrical field strength situated at the resistance in V/mm
G = electrical field strength, measured in V/mm in the direction of the potential drop for a current density of 1 $mA/cm^2$
α = exponent which determines non-linearity $\alpha$ is usually defined for one or more regions of interest of the current density.

In the present case, $\alpha$ is defined for a current density of 0.15 $mA/cm^2$.

The varistors prepared by the novel process are characterized, besides uniformity and good reproducibility, by significantly improved electrical values. For comparison, two varistors of identical composition were prepared, one by the conventional process and the other by the process according to the invention. For a composition defined in Example 4, the comparison values were as follows:

| | $\alpha_{0.15\ mA/cm^2}$ | C (V/mm) |
|---|---|---|
| conventional process | 18 | 160 |
| novel process | 78 | 205 |

We claim:

1. A process for the preparation of a voltage-dependent ceramic resistance based on ZnO and other oxides selected from the group of addition elements Co, Mn, Cr, Ni, Ba, Bi, Sb, rare earths, Al, B, Si, Ga, Ti comprising the steps of (i) first suspending the ZnO in powder form in an aqueous solution and directly treating the ZnO with the particular addition element in the form of an organic salt or complex compound dissolved in water in the case of the elements Co, Mn, Cr, Ni, Al, Ba, Bi, Sb, Ga, Ti and rare earths, and in the form of an acid or the ammonium salts thereof or alkyl esters dissolved in water in the case of the elements Cr, Si and B, the treating of the suspended ZnO with the particular addition element resulting in a suspension of ZnO in an aqueous solution of the addition element;

(ii) immediately drying the step (i) suspension of ZnO in the aqueous solution of the addition element in a spray dryer in the presence of air to a powder or granules;

(iii) uniaxially, two-dimensionally radially or isostatically cold pressing this powder or these granules and subsequently heating the press body for the purpose of sintering in stages to a temperature of 650° C., 900° C. and then 1100° to 1300° C.; and (iv) cooling the sintered body prepared in this manner to room temperature.

2. A process as claimed in claim 1, wherein the addition elements are in each case added to the ZnO suspension in water in the form of a water-soluble salt of a hydroxy-substituted or unsubstituted mono, di, tri or tetracarboxylic acid.

3. A process as claimed in claim 1 further comprising the step of adding ammonia, an ammonium salt of a hydroxycarboxylic acid or an organic amine to the aqueous solution of organic salts.

4. A process as claimed in claim 1 further comprising the step of adding, in the production of the powder or granules, the addition elements Cr, Si and B to the ZnO suspension in water in the form of a true or colloidal solution of an acid of Cr, Si and B or as the ammonium salts thereof or as alkyl ester or as hydroxide sol, in each case in water.

5. A process as claimed in claim 1 further comprising the step of heating the powder produced by spray drying to 400°-700° C. prior to pressing, thus converting all addition elements to their oxides.

6. A process as claimed in claim 1 further comprising the step of spray drying the suspension containing ZnO and all required addition elements at 400°-700° C., simultaneously converting the addition elements to their appropriate oxides.

* * * * *